Oct. 4, 1932.    E. J. W. RAGSDALE    1,880,480
AIRPLANE STRUCTURE AND METHOD OF MAKING SAME
Filed Sept. 13, 1929    2 Sheets-Sheet 1
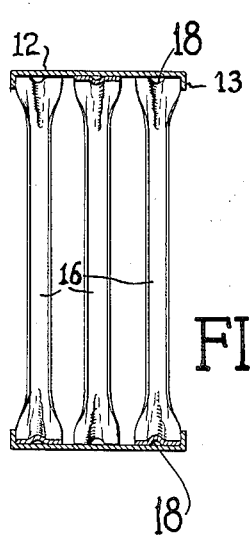
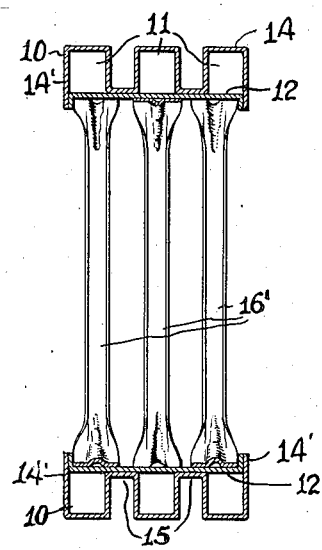
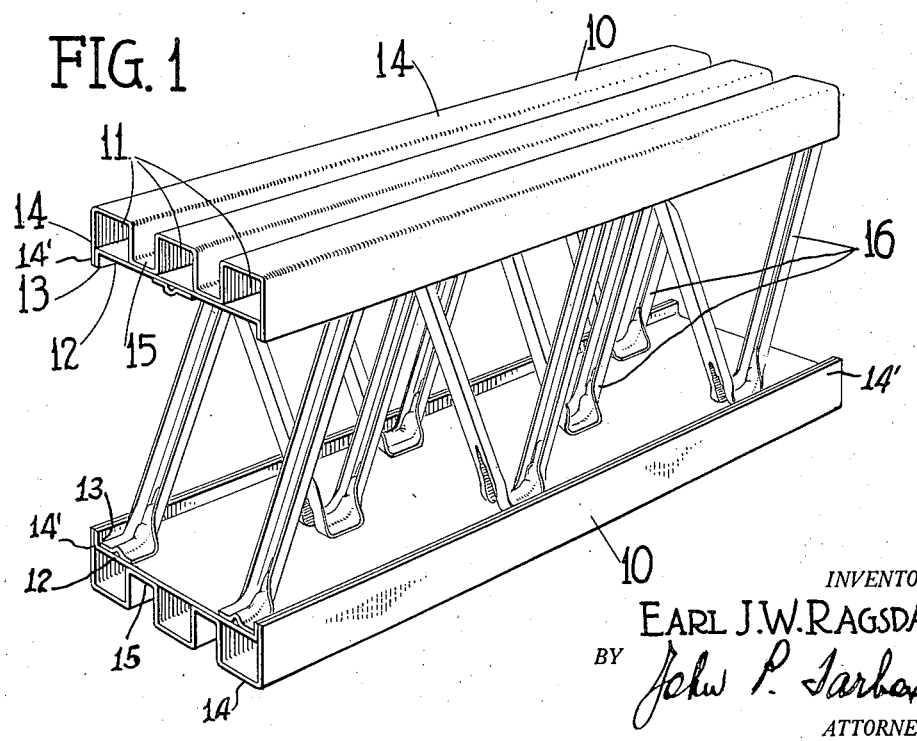
INVENTOR.
EARL J. W. RAGSDALE
BY John P. Tarbox
ATTORNEY.

Oct. 4, 1932.  E. J. W. RAGSDALE  1,880,480
AIRPLANE STRUCTURE AND METHOD OF MAKING SAME
Filed Sept. 13, 1929   2 Sheets-Sheet 2
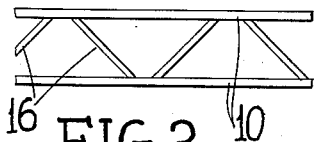
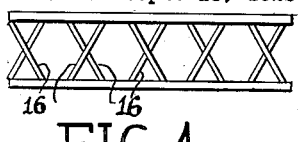
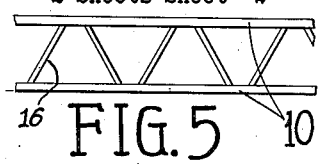
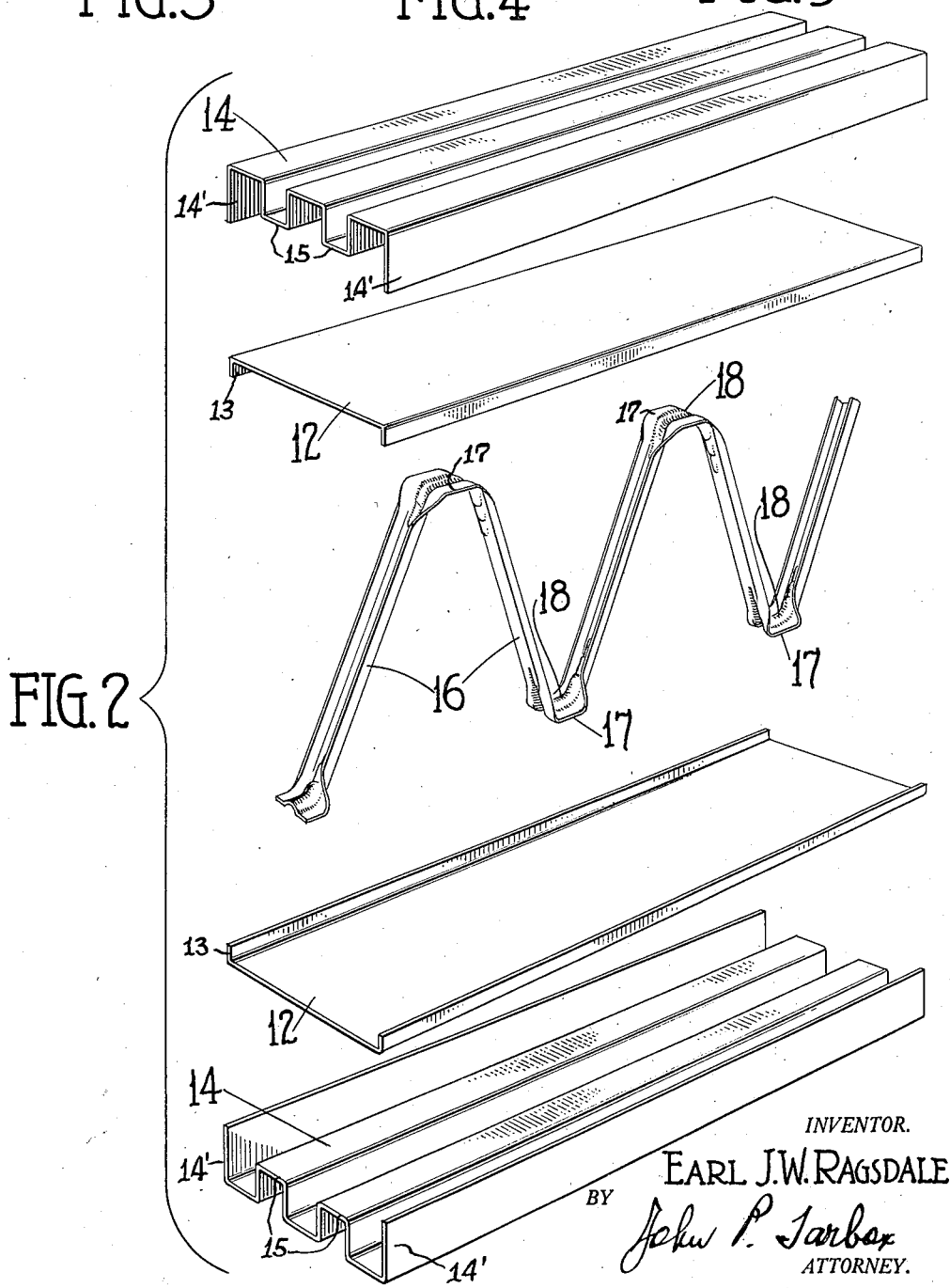
INVENTOR.
EARL J.W. RAGSDALE
BY
ATTORNEY.

Patented Oct. 4, 1932

1,880,480

UNITED STATES PATENT OFFICE

EARL J. W. RAGSDALE, OF NORRISTOWN, PENNSYLVANIA, ASSIGNOR TO EDWARD G. BUDD MANUFACTURING CO., OF PHILADELPHIA, PENNSYLVANIA, A CORPORATION OF PENNSYLVANIA

AIRPLANE STRUCTURE AND METHOD OF MAKING SAME

Application filed September 13, 1929. Serial No. 392,318.

The truss and method of fabricating the truss of my invention, in the best embodiment now known to me, constitutes a spar for use in aircraft construction, particularly a wing spar for an airplane wing or other aerofoil. In such spars commonly built of wood and to some extent of metal, chord members interconnected by a lattice-work of trussing of one type or another are commonly used. In some large aircraft spars are made of closed cross section chords interconnected by a lattice work of trussing. These closed cross section chords where met with are nearly always tubular. The lattice-work for trussing is connected to them by rivets or other fastening devices applied or at least anchored from the interior surfaces of the closed cross sections. Such trusses have proven very efficient under load conditions, being very strong and sturdy but their minimum weight is limited by the nature of the sections and their shape, the material used as determined to some extent by the character of the riveted or bolted fastenings, the extremely large number of such fastenings which need be used, the cutting into the body of the chords to accommodate such fastenings, and other factors. At the same time these considerations and those of available shapes very seriously limit the range of adaptability and also limit the minimum cost at which these relatively large expansive fabrications can be carried out.

It is a prime object of my invention to remove weight, adaptability, and cost limitations in this form of truss.

I propose to use flat strip stock of alloy steel of high physical characteristics, of rustless steel, which can be rolled to any desired shape either at the mills or at the aircraft fabricating plants and die formed to some extent. Utilization of strip stock guarantees its availability in reasonable widths in unlimited lengths, providing continuity of all members from one end of the truss to the other. Spot welding constitutes one of the most rapid securing means known and also one of the most perfect from the standpoint of strength, yet it is a weightless fastening means requiring no metal other than that of the stock joined. The amount of spot welding may be multiplied unlimitedly without adding to the weight. Nor does it cut into the body of the members joined or impair their strength no matter what the multiplication of its use. This factor coupled with the high physical characteristics of the rustless alloy steel when utilized according to the structure and method of my invention achieve for me its principal object—the removal to some extent of the limitations of adaptability and cost—and the structure and method go the balance of the way in removal of these limitations.

According to my method I fabricate closed section chord members in longitudinally complemental cross sectional parts, dividing the cross sections for such fabrication in planes extending laterally of the truss, first securing together the inner chord members by trussing applied to the inner faces of the inner members, and thereafter applying the outer parts of the chord members to the inner. Specifically, I spot weld the inner members to each other by spot welding their faces which present inwardly of the truss to the intermediate trussing by application to the outer faces of these inner chord members, and thereafter spot weld the outer chord members to the inner.

The structure, which is to a considerable degree inter-twined with the method, comprises chord members having these longitudinally continuous inner and outer parts, one such part being of substantially plane cross section with relatively short edge flanges and the other part of corrugated form, the outermost branches of which corrugations are turned to overlap the flanges of the one part, which two parts are secured together by spot welding from the bottoms of the corrugations and in the overlaps of the flanges, and continuous strip Warren or other trussing in a plurality of longitudinally extending sets in general of channel cross section but having flattened reinforced apexes spot welded to the inner chord member.

In this construction my objects have been to attain accessibility for welding throughout the structure from the exterior of the structure with a minimum of interference, and so far as practicable by the available standard die machinery. A scarcely less object has been the production of a spar the section and strength of which may be varied throughout its length from point to point and adjusted to meet the varied stresses of an airplane wing, to regulate the weight without necessarily changing the over-all perimeter of the spar whereby wing ribs of standard size and weight may be used throughout the length of the spar.

Of the drawings,

Figure 1 is a three quarters perspective of a portion of such a spar.

Figure 2 is a perspective in super-imposed vertical position but spaced vertically apart of the several elements which enter into the structure.

Figures 3, 4 and 5 are diagrams indicating the manner of applying the trussing intermediate the chord members.

Figures 6 and 7 are respectively transverse cross sections of a spar in different stages of assembly according to my method.

The upper and lower chord members are designated 10. They are identical and the description of one suffices for the other. Each chord member is of closed cross section specifically comprising a plurality of transverse divisions 11 of such closed cross section, each longitudinally extending the full length of the chord member. Each chord member comprises two longitudinally extending parts, an inner one 12 of substantially plane form having laterally flanged edges 13, and the other 14 of corrugated form, the edges 14' of which are overlapped upon the flanges 13 and the bottoms 15 of the corrugations of which contact with the outer face of the part 12. These longitudinally extending inner and outer parts 13 and 14 are formed of the alloy steel strip stock of high physical characteristics in lengths continuous from end to end of each chord member and of the general form shown clearly in Fig. 2.

The intervened trussing is in the form of a lattice-work comprising a plurality of sets 16 of continuous Warren trussing. This trussing is rolled and die formed from continuous strip stock of alloy steel of high physical characteristics into the form shown in Fig. 2. It is of channel cross section in the main bodies of its struts but of plane form at its apexes 17, the channels being flattened out, or the strip stock not being rolled completely to channel form in the regions of the apexes 17. The full flattened portions extend substantially truly transversely of the apexes and are gradually merged into the channel cross sections in the bodies of the struts. Extending across the flattened apexes 17 and down into the channels themselves are centrally located longitudinally extending reinforcing beads 18 whose cross sections are directed interiorly of the truss and whose cross sections are a maximum in the flattened portions and gradually faded out into the full channel section portions. The different sets of trussing 16 have their points of connection to the chord members staggered, as clearly shown in Fig. 1 and in Figs. 3 to 5 in which latter, Fig. 3 shows one set 16 in place between the chord members 10. Fig. 5 shows another in place between the same lengths of chord members, and Fig. 4 shows the two sets as connected in place to the same lengths.

According to the method of my invention, I first fabricate the longitudinally extending inner and outer parts 12 and 14 of the chord members 10 as they appear in Fig. 2. During the same time I prepare the intermediate sets of trussing 16 by rolling and die forming this continuous strip stock, then secure the inner members 12 together by spot welding their inner faces to the flattened apexes 17 of the sets of Warren trussing 16. Preferably I secure all sets in place and to the inner faces of the chord members 12 progressively from one end of the members to the other whereby the spar is progressed from one end to the other through a welding machine of standard form. This saves much time since the welding operations can be carried on very rapidly and but a single jigging operation is necessary to relatively position the parts. The extent of flattening in the regions 17 of the apexes may be made anything desired and the number of spot welds and their size likewise adjusted to suit the conditions desired. Thereupon I apply the outer parts 14 of the chords to the inner 12 contacting the bottoms 15 of the corrugations upon the outer faces of the members 12 and overlapping and contacting the edges 14' upon the flanges 13, and in succession weld the bottoms of the corrugations to the outer faces of the members 12 and the edges 14' to the flanges 13. The two main stages of this operation are illustrated respectively in Figs. 6 and 7 and the completed article in Fig. 1.

It should be apparent that this method and the structure in which it is utilized attain for me all the objects of my invention. Strip stock is utilized throughout. The parts may be given any desired cross sections but those of this particular embodiment have been found highly efficient by me. The extent of their contacting and inter-welded areas may be made anything desirable to suit the conditions of the gauge of the metal and the cross sections and the general dimensions of the spar itself. So also may the shapes and size and number of the corrugations be changed at will; likewise the shapes and size and extent of the reinforcing beadings 18. The number of sets of Warren trussing 16 may be varied from one region to another of the spar. So also may its angularity. Simultaneously may the number of corrugations be varied.

Joints of chord members of one width to chord members of another width are most simply carried out by overlapping chord parts upon each other and spot welding them. These and many other adaptabilities are made most feasible. At the same time, by very nature of the structure and method I have chosen, also the weight and cost limitations are removed, for the structure not only utilizes metal at its greatest efficiency and possesses all the advantages of other processes of closed chord cross sections, but it also is susceptible of spot welding throughout by access to points within the transverse perimeter of the truss from a standard machine located without that perimeter. All these factors enter into the production of, the advantages, and the attainment of the objects I have sought in other ways still than heretofore outlined.

An invention of such adaptability can but be possessed of a great number of modifications and be susceptible of a great number of improvements without departing in any wise from its generic spirit. The annexed claims, therefore, should be interpreted irrespective of the terminology in terms of that spirit.

What I claim is:

1. A truss comprising chord members and a plurality of sets of continuous Warren trussing connecting said chord members, the trussing consisting of hollow sectioned stock flattened in regions of connection with the chords and secured to the chord through the flattened regions and having a beaded reinforcement interconnecting the channel sections and the flattened regions and extending through the flattened regions.

2. A truss comprising chord members including flat cross sectioned relatively wide continuous strip stock, a plurality of sets of intervened continuous strip stock trussing extending respectively longitudinally of said chord members and connected to the inner face thereof, and corrugated longitudinally continuous chord members overlying said flat stock strip chord members and secured thereto in the bottoms of the corrugations.

3. A truss member comprising chord members having longitudinally continuous inner and outer parts, one such part being of substantially plane cross section with relatively short edge flanges and the other part of corrugated form, the outermost branches of which corrugations are turned to overlap the flanges of the one part, which two parts are secured together by spot welding in the bottoms of the corrugations and in the overlaps of said flanges, and continuous strip Warren trussing in a plurality of longitudinally extending sets in general of channel cross section but having flattened and reinforced apexes spot welded to the inner chord members.

4. A truss having chord members comprised of inner and outer portions one portion of which is of substantially flat cross section and provided with inturned side flanges, and other portions of corrugated cross section the bottoms of which corrugations are spot welded to the flat cross section members, the tops of which corrugations lie in a common transverse plane, and the outer edges of which corrugations are overlapped upon said flanges and spot welded thereto.

5. A truss comprising chord members comprised of complemental longitudinally extending members, the one of flat cross section and the other of corrugated cross section and both relatively wide, which sections are secured together through the bottoms of the corrugations, and trussing intervened between said cord members.

6. A truss comprising chords including inner and outer members, the inner members being of substantially flat strip stock and the outer members of hollow cross section and secured to the inner members along their edges to form closed hollow-section chords, and trussing interconnecting said hollow chords and secured to the flat inner faces of said inner members.

7. A hollow truss chord comprised of inner and outer members, the inner member being substantially flat in its body and flanged along its edges, and the outer member being corrugated and secured to the inner member through the bottoms of certain of the corrugations and through its edges overlapping the edge flanges of the inner member.

In testimony whereof he hereunto affixes his signature.

EARL J. W. RAGSDALE.